United States Patent [19]

Heiser et al.

[11] Patent Number: 4,566,274
[45] Date of Patent: Jan. 28, 1986

[54] CONTROL DEVICE FOR A HYDROSTATIC DRIVE

[75] Inventors: Joachim Heiser, Stuttgart; Dieter Weigle, Urach, both of Fed. Rep. of Germany

[73] Assignee: Robert Bosch GmbH, Stuttgart, Fed. Rep. of Germany

[21] Appl. No.: 538,415

[22] Filed: Oct. 3, 1983

[30] Foreign Application Priority Data

Oct. 2, 1982 [DE] Fed. Rep. of Germany ....... 3236580

[51] Int. Cl.$^4$ ............................................. F16H 39/46
[52] U.S. Cl. ....................................... 60/444; 60/445; 60/447; 60/448; 60/449
[58] Field of Search ................. 60/444, 445, 448, 451, 60/452, 426, 419, 434, 424, 417, 427, 447, 449

[56] References Cited

U.S. PATENT DOCUMENTS 3,693,349  9/1972  Morris ................................... 60/448
3,932,993  1/1976  Riedhammer ........................... 60/449
4,168,612  9/1979  Nikolaus ................................ 60/449

FOREIGN PATENT DOCUMENTS 2739968  3/1979  Fed. Rep. of Germany ........ 60/448

Primary Examiner—Robert E. Garrett
Assistant Examiner—John M. Husar
Attorney, Agent, or Firm—Michael J. Striker

[57] ABSTRACT

Disclosed is a control arrangement for a hydrostatic drive of the type having a power-driven adjustable pump, a pressure responsive setting cylinder coupled to the pump, a hydraulic motor connected via pressure conduits to the pump and a measuring motor coupled to the hydraulic motor to rotate with a proportional rotary speed. A supply pump is connected in a control circuit including the measuring motor and a nominal or desired value generator in the form of an adjustable throttle by means of which the desired rotary speed of the hydraulic motor is adjusted. Deviations between the actual and desired speeds produce a differential control flow which is fed to the setting cylinder which adjusts the position of an adjusting member of the pump for so long as until the deviation equals zero.

13 Claims, 7 Drawing Figures

CONTROL DEVICE FOR A HYDROSTATIC DRIVE

BACKGROUND OF THE INVENTION

The present invention relates in general to a hydraulic control circuit and in particular to a control device for a hydrostatic drive of the type including an adjustable pump, a pressure-responsive setting cylinder coupled to the pump, a hydraulic motor connected via working conduits to the pump and a measuring motor coupled to the hydraulic motor to operate with a proportional speed therewith and cooperating with flow volume adjusting means to generate a control flow for the hydraulic motor in order to regulate its rotary speed.

In prior-art control devices of this kind an adjustable throttle is arranged in the measuring circuit of the measuring motor, and as the hydraulic motor is adjustable by means of a setting cylinder which depending on the throughflow value fed by the adjustable throttle in the measuring circuit, is adjusted to the desired rotary speed. This known controlling device, however, does not take into consideration the behavior of the pump so that the field of application as well as the control accuracy of such prior-art devices are limited.

SUMMARY OF THE INVENTION

A general object of the present invention is to overcome the aforementioned disadvantage.

More particularly, it is an object of the invention to provide an improved control device of this type which enables in a very simple manner to derive from the deviation of an actual rotary speed of the hydraulic motor from a preset desired value a signal for adjusting the pump to a delivery which balances with the deviation.

An additional object of the invention is to provide such an improved hydraulic control device which allows the application of modular elements and an increased freedom of the arrangement.

A further object of the invention is to provide such an improved device which readily compensates for fluctuations in the driving motor and regulates changes in volumetric flow output. The latter feature is important particularly at low rotary speeds of the hydraulic motor.

Furthermore, an object of this invention is to provide an improved regulating or control device which permits the selection of a manual or an electrical remote control of the rotary speed.

In keeping with these objects and others which will become apparent hereafter, one feature of the invention resides, in a control device of the aforedescribed kind, in the provision of a nominal flow value adjuster connected in the measuring circuit of the measuring motor to produce a control flow for the hydraulic motor, by dosing to the measuring motor a flow volume at which the hydraulic motor attains its nominal rotary speed, and means for detecting flow difference between the nominal flow volume adjuster and the measuring motor, the detecting means controlling pressure fluid supply to the setting cylinder of the pump so as to keep adjusting the pump for so long as until the flow volume absorbed by the measuring motor equals the flow volume discharged from the nominal flow value adjuster.

In a preferred embodiment of this invention, the nominal flow value adjuster is in the form of a pump driven by an electric motor for adjusting the flow of pressure fluid in the measuring circuit.

The novel features which are considered characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
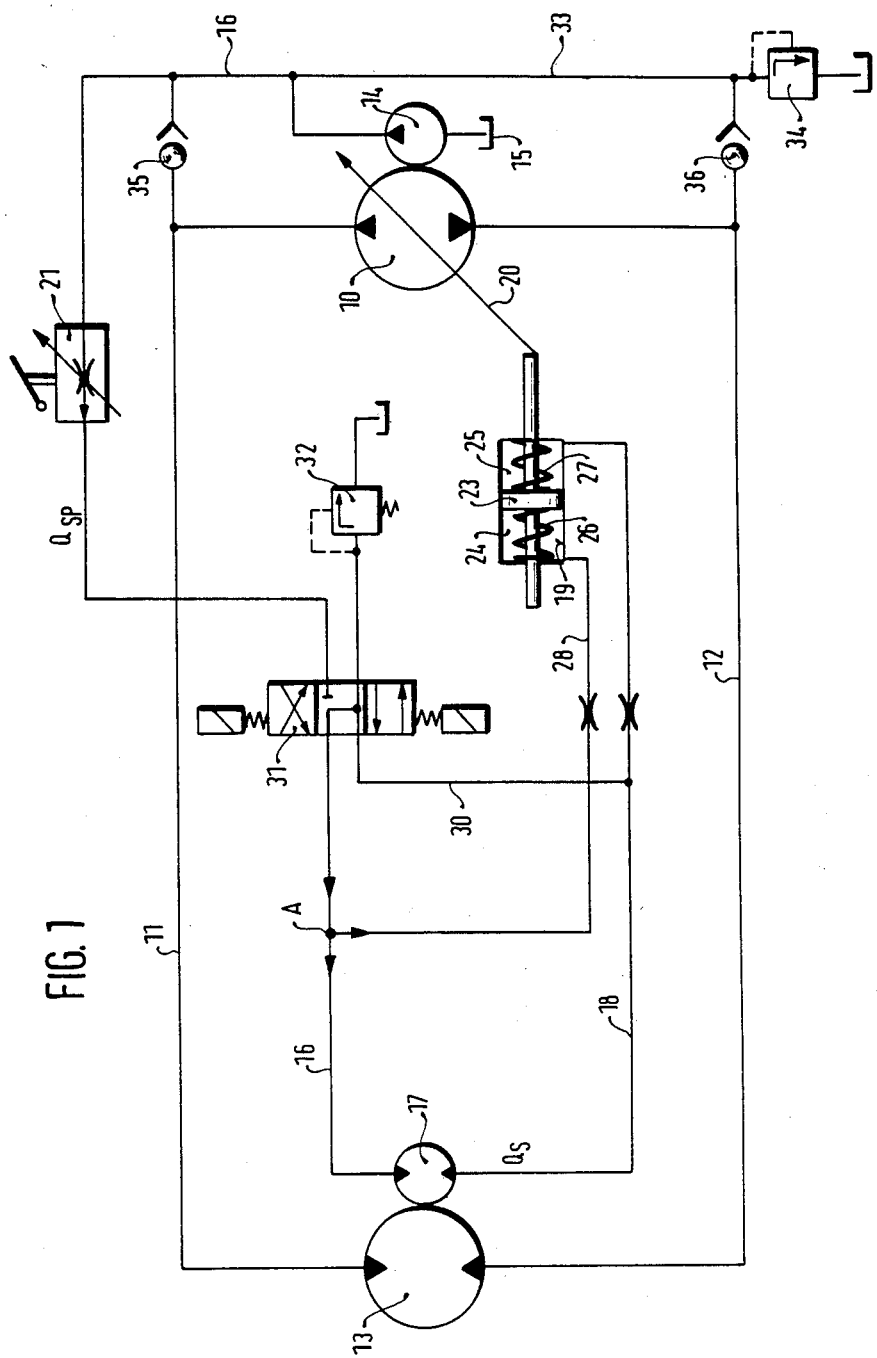
FIGS. 1–7 show schematically hydrostatic drives provided with different embodiments of the control device of this invention.

Referring firstly to FIG. 1, there is illustrated an embodiment of this invention in its simplest form. An adjustable pump 10 driven by a non-illustrated driving machine is connected in a closed circuit by main working conduits 11 and 12 with a non-adjustable hydraulic motor 13. A supply pump 14 is driven at a speed proportional to the rotary speed of the pump 10 to suck a pressure fluid out of tank 15 and displace the fluid in a control conduit 16. The latter conduit 16 leads to a measuring motor 17 which is driven at a rotary speed which is proportional to that of the hydraulic motor 13. The outlet of measuring motor 17 is connected via a conduit 18 to a setting cylinder 19 whose piston 23 is coupled to adjusting member 20 of the adjustable pump 10. An adjustable throttle 21 which can be also replaced by a functionally equivalent flow regulating valve is arranged in the control conduit 16 so that the supply pump 14, control conduit 16, throttle 21, measuring motor 17 and the setting cylinder 19 form together a control circuit for adjusting the pump 10. The inlet of measuring motor 17 and the flow regulating valve or throttle 21 are connected in series.

The setting cylinder 19 is a double-acting one, that means it includes a piston 23 dividing the cylinder into two pressure spaces 24 and 25 and being loaded from two opposite sides by pressure springs 26 and 27. The output conduit 18 for motor 17 communicates with the pressure space 25, whereas the other pressure space 24 is connected via a conduit 28 to a section of the control conduit 16 between the throttle 21 and the motor 17. Reference character A indicates the branching point of the conduit 28 from the control conduit 16. A conduit 30 branches from the output conduit 18 and leads via a 4/3-control valve 31 to a return conduit for discharging the fluid to a tank. The 4/3-control valve is adjustable to any of its switching positions and controls also the flow through the control conduit 16 in such a manner that the control flow to the setting cylinder 19 can be reversed so as to reverse the operation of the pump 10. The return conduit, which in the neutral position of control valve 31 communicates with the conduit 30, is provided with a biased valve 32 operating with a minute opening pressure for the return flow.

The connection point of output conduit from supply pump 14 and control conduit 16 is connected via a branch conduit 33 to a pressure-limiting valve 34 which serves for limiting pressure of fluid supplied to control conduit 16. Pressure oil supplied by the pump 14 is fed via non-return or backstroke valves 35 and 36 to respective low pressure conduits of the main circuit 11 and 12.

The control device of this invention operates as follows: The delivery of the supply pump 14 depends on the rotary speed of the adjustable pump 10; nevertheless, it always exceeds the flow volume absorbed by the measuring motor 17 and the replenishment of leakage losses in the main circuit 11 and 12. The overflow volume is returned via the pressure limiting valve 34 to a reservoir. In this manner the supply pump 14 provides a substantially constant pressure in the pressure conduit section 16 upstream of the throttle 21. The flow volume absorbed by the measuring motor 17 depends on the rotary speed of the hydraulic motor 13. For instance, when the flow through the throttle 21 is larger than the flow volume received by the measuring motor 17, then the different stream flows from the connection point A in control conduit 16 through conduit 28 through chamber 24 of the setting cylinder 19 inasmuch as the sum of incoming and outcoming streams to a common point must equal zero. The flow of the difference pressure liquid in conduit 28 keep adjusting via the setting cylinder the pump 10 so long until the stream of pressure fluid fed to the measuring motor 17 equals the stream of pressure fluid passing through the throttle 21. The setting motion of the cylinder 19 at this moment and of the pump 10 stops and a new balanced condition is established at which the pump 10 has a correct delivery for adjusting the desired new rotary speed of the hydraulic motor 13. By changing the throughflow cross section of the throttle 21 a simple adjustment suitable particularly for a remote control, of the rotary speed of the hydraulic motor 13 is made possible, whereby both the desired and actual values are very quickly settled.

Figure 2:
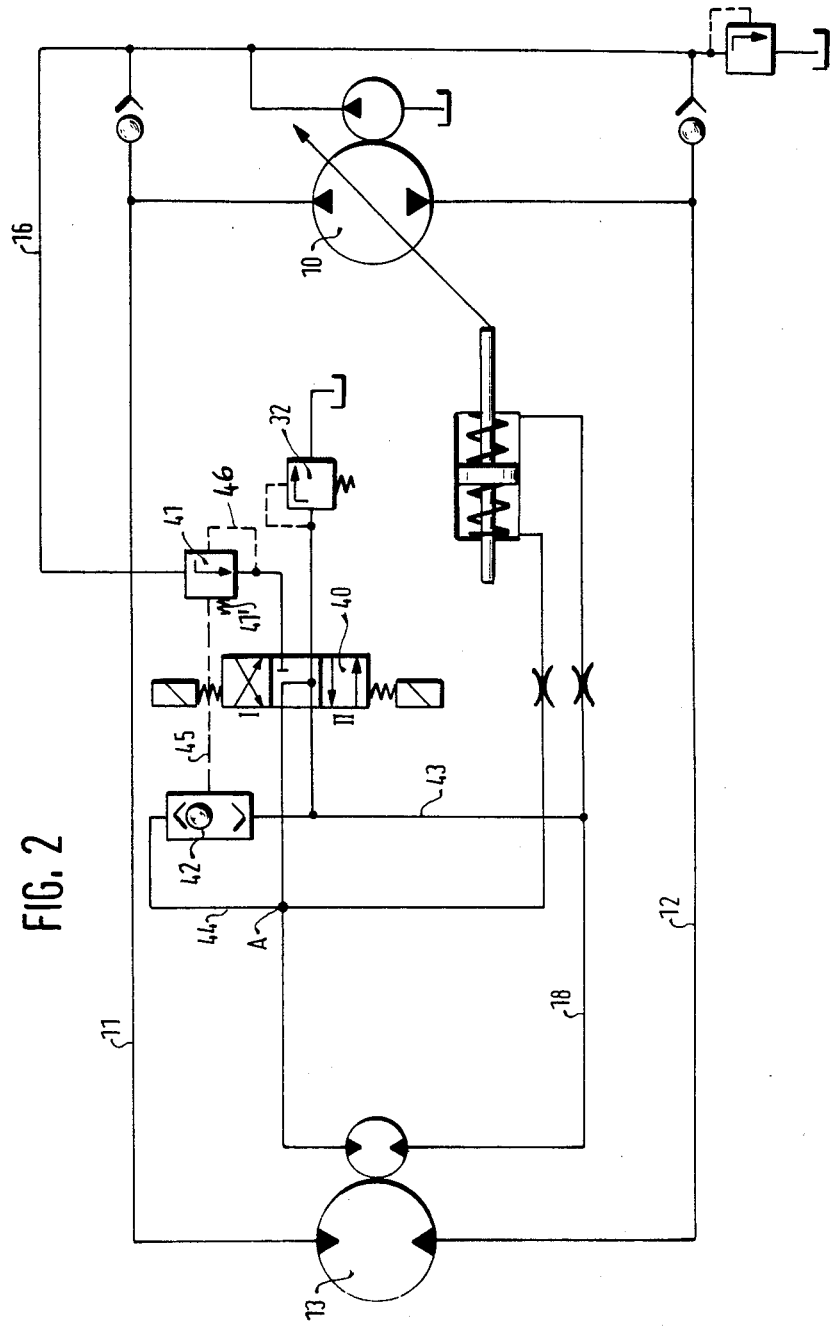

The embodiment according to FIG. 2 differs from that of FIG. 1 only by a different application of the desired flow value. The desired flow value adjuster in this kind consists of an electrically actuated proportional multiway control valve 40 coupled to a pressure balance 31 connected in series with the control conduit 16 and being loaded by a spring 41'. In addition, the nominal flow value adjuster includes an alternating back stroke valve 42, which at one port is connected via conduit 43 to the output conduit 18 and at the other port via conduit 44 to the control conduit 16. This connection of the double-acting non-return valve 42 ensures that a higher fluid pressure is selected between the two conduits 16 and 18 and applied via an output conduit 45 to the pressure balance 41. A branch conduit 46 applies to the pressure balance 41 a pressure derived from the control conduit 16 before the multiway control valve 40, so that this pressure counteracts the pressure in the conduit 45. In one of the two working positions I or II of the multiway control valve 40 a certain difference pressure is maintained with the aid of the pressure balance 31 on its control cross sections. Depending on the adjusted position of the valve 40, the hydraulic motor 13 is preset by a corresponding adjustment of the pump 10 to a certain rotary speed, whereby the actual and desired values of the rotary speed are compared and regulated via the pressure balance 41 and the proportional valve 40 for so long until the two values are equal. The purpose of the pressure balance 41 is to maintain the desired value constant independently from the setting pressure in the cylinder 19.

Figure 3:
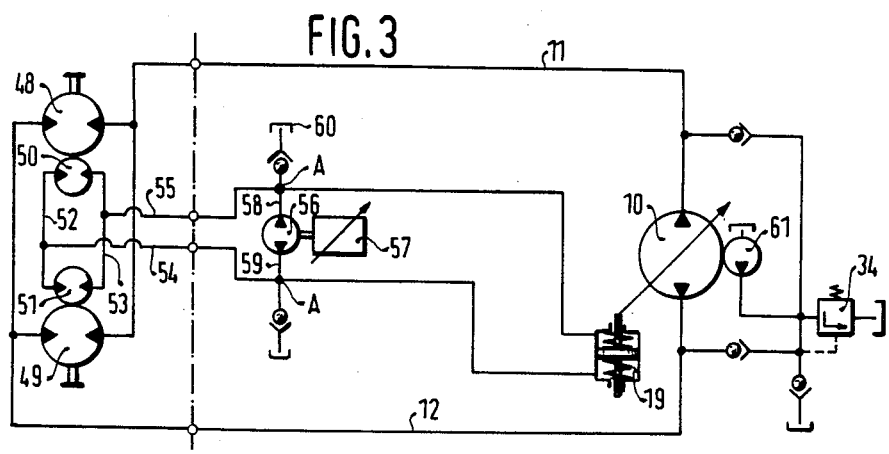

In the modification according to FIG. 3, component parts corresponding to those in the preceding examples are designated by like reference numerals. In this embodiment, there are provided two hydraulic motors 48 and 49 each coupled to a measuring motor 50 or 51. The measuring motors are interconnected by conduits 52 and 53 to form a closed circuit. Conduits 54 and 55 branching respectively from the conduits 52 and 53 are connected to the pressure spaces 54 (FIG. 1) and 55 of the setting cylinder 19.

An electric motor 57 drives a measuring pump 56 which depending on the direction of its rotation feeds a pressure medium from tank 60 either in the conduit 54 or 55. Respective flows of pressure medium in the measuring pump 56 and in the measuring motors 50 and 51 are added to or subtracted from one another in the corresponding conduit 54 or 55. Depending on the deviation of the desired value from the actual value, the pump 10 is being adjusted so long until the two values coincide. For example, if the measuring pump 56 delivers more pressure fluid than the measuring motors 50, 51 can absorb, the pump 10 is off for so long until the desired value equals the actual value. Hence, by changing the rotary speed of the pump 56, a simple control of the rotary speed of motors 48 and 49 is made possible, inclusive of the balancing of desired and actual flow values. This mode of operation corresponds exactly to that of the embodiment of this invention in FIG. 1.

Figure 4:
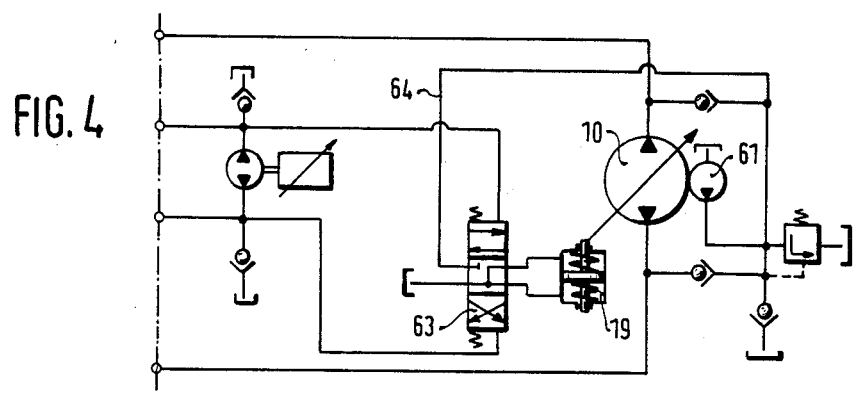

In the modification according to FIG. 4, a preliminary control valve 63 controls the connection of a conduit 64 from the supply pump 61 to the setting cylinder 19. The slide of control valve 63 is activated by pressure across the measuring pump 56 and the control pressure for the setting cylinder is supplied through conduit 64 by the supply pump 61. In this manner, a very sensitive adjustment of pump 10 is made possible.

Figure 5:
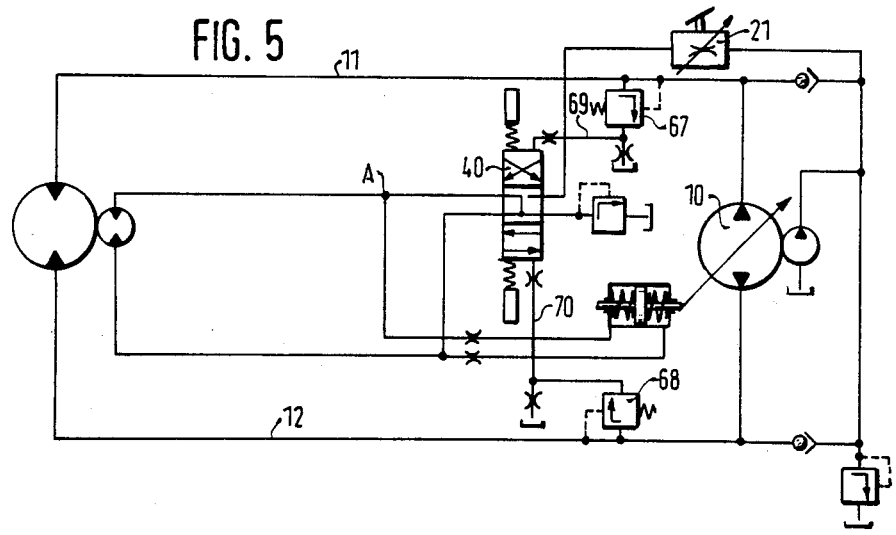

In the embodiment according to FIG. 5 there is the difference relative to that of FIG. 4 of the provision of pressure limiting valves 67 and 68 in the main conduits 11 and 12. Each of the pressure limiting valves is connected via a conduit 69 or 70 to control ports at the end faces of the proportional multiway control valve 40. Upon reaching an upper pressure limit in a high pressure main conduit 11 or 12, the pump 10 is reset. For example, if the high pressure limit is reached in the main conduit 11, then pressure limiting valve 67 opens and high pressure fluid flows via conduit 69 against the end face of the slider of control valve 40 so that the latter is switched over to a position in which the setting cylinder 19 reduces the delivery of the pump 10. This mode of operation is particularly applicable in constructions where the proportional multi-way control valve 40 is controlled by means of switching or proportional solenoids. In this way a so-called lossfree pressure limitation is achieved.

Figure 6:
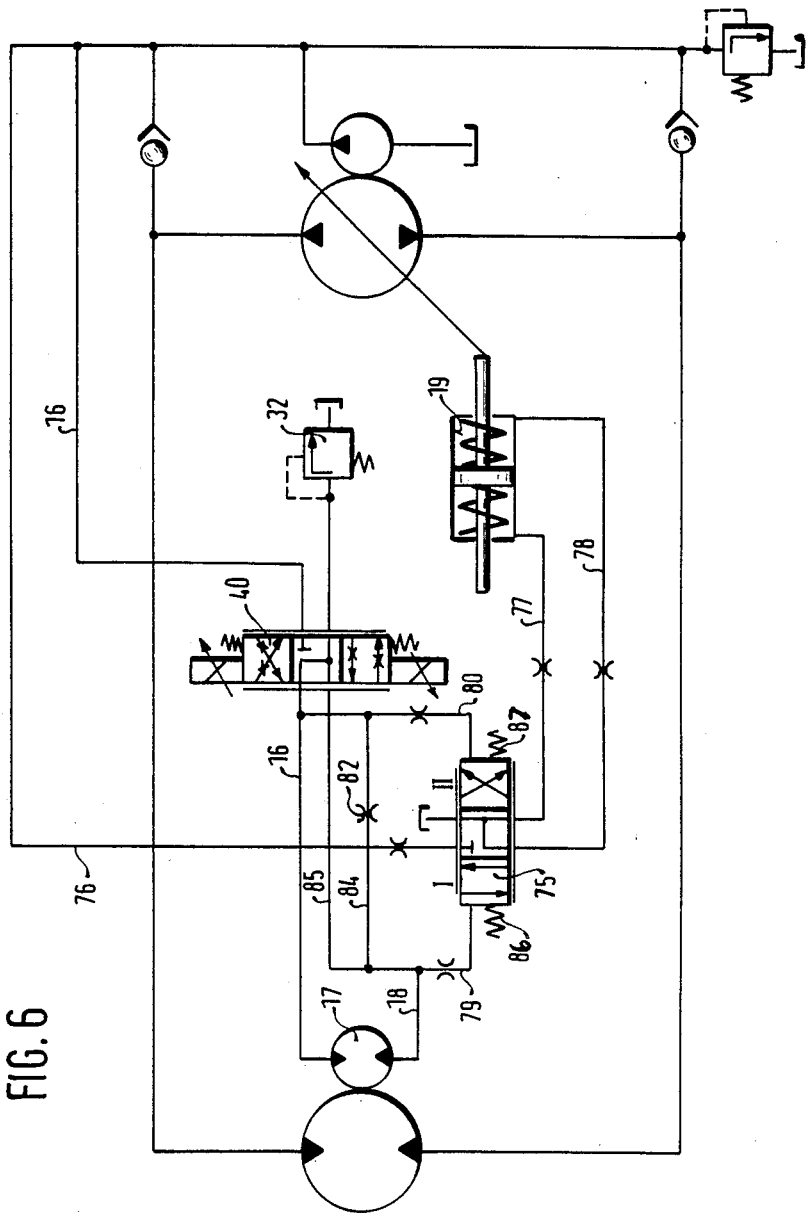

In the embodiment of FIG. 6 the control conduit 16 is again connected to an externally controlled proportional multi-way control valve 40. In addition, there is provided a hydraulically controlled regulating valve 75 for controlling the connection of a branch conduit 76 from the control conduit 16 to two conduits 77 and 78 leading to the setting cylinder 19. The two end faces of the regulating valve 75 communicate via conduits 79 and 80 with control conduit 16 and output conduit 18. The conduits 79 and 80 are interconnected by a conduit 84. In addition, a conduit 85 leading from the multiway control valve 40 opens into the conduit 79. The regulating valve 75 is acted upon by different pressure in conduit 79, 80, 16 and 18. In dependence on the desired direction of delivery of the pump 10, one of the end faces of the regulating valve is connected to the supply conduits to the measuring motor, whereas the other end face is connected to the return conduit. The pressure of return fluid is determined by a biased valve 32.

The difference between the desired or nominal flow value adjusted by the proportional multi-way control valve 40, and the absorption volume of the measuring motor 17, produces, in cooperation with the throttle 82 in the conduit 84, a pressure at the controlling face of the regulating valve 75 which is either higher or lower than the counterpressure determined by the biased valve 32. According to the sign of this pressure difference, the regulating valve 75 is shifted either to a switching position I or II, thus affecting the setting or resetting of the pump 10. In contrast to the direct control, the adjusting velocity of the pump 10 is independent from the flow volume through the measuring motor 17, and the resetting is not made by a special fluid. In this embodiment, a pressure balance at the proportional multiway control valve 40 is no longer necessary. The pressure gradient on the latter is kept constant by springs 83 and 84 of the regulating valve 75.

Figure 7:
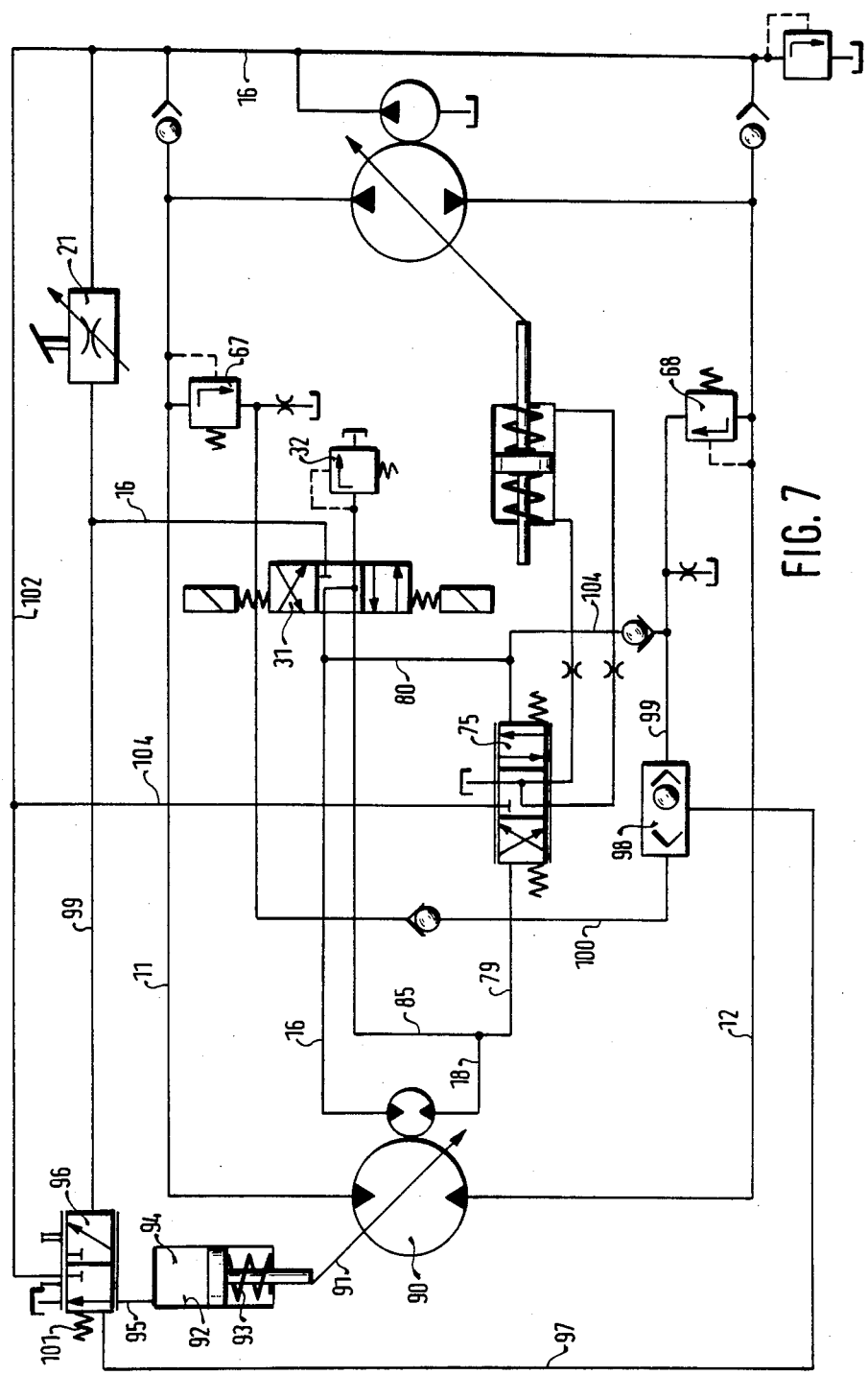

It will be seen from the exemplary embodiment of FIG. 7 that this invention is also applicable to an adjustable hydraulic motor 90. An adjusting member 91 of the hydraulic motor is controlled by means of a single-acting setting cylinder 92 whose piston is loaded by a biasing spring 93. Pressure space 94 of the setting cylinder is connected via a conduit 95 to a preliminary control valve 96. A conduit 97 from the output port of a double-acting or alternating backstroke valve 98 leads to one end face of the preliminary control valve 96. The opposite end face of the valve 96 communicates with a conduit 99 opening into the control conduit 16. Similarly as in the example of FIG. 1, the control conduit 16 is provided with a proportional multiway control valve 31 cooperating with a pressure balance 32. An end face of the alternating backstroke valve is acted upon by pressure fluid from conduit 99' leading via a pressure limiting valve 68 to the main pressure conduit 12 similarly as in the embodiment of FIG. 5. The other end face of the backstroke valve 98 communicates via a conduit 100 and another pressure limiting valve 67 with the other main pressure conduit 11. It will be seen that the embodiment of this invention according to FIG. 7 combines the elements of embodiments of FIGS. 1, 5 and 6 with an adjustable hydraulic motor 90. A pressure spring 101 loads the preliminary control valve 16 in the direction of flow of pressure fluid from the conduit 97. The intake port of regulating valve 75 is connected via conduit 104 to conduit 102, which branches from the control conduit 16 before the throttle 21 and leads to the preliminary control valve 96. Due to the simultaneous adjustment of the pump 10 and the hydraulic motor 19, ambiguous operational conditions might result when the ranges of adjustment are not distinctly separated. This separation is achieved by means of the precontrolled regulating valve 75. The preliminary control valve 96 connects in its rest position the pressure space 94 of the setting cylinder to the tank, while the conduit 99 is normally without pressure. As a consequence, loading spring 93 of setting cylinder 92 adjusts the operation of the hydraulic motor 90 to its full absorption volume. When a deviation between desired and actual rotary speeds of measuring pump and of the measuring motor occurs, the resulting pressure difference between conduits 16 and 18, 79 first displaces the regulating valve 75 pertaining to the pump 10. Only after the occurrence of a still increased regulation error the preliminary control valve 96 for adjusting the hydraulic motor is displaced from its switching position I to its switching position II. As a result, pressure fluid delivered by the supply pump 14 in conduits 16 and 102 reaches the pressure space 94 of setting cylinder 92 and the hydraulic motor 90 is adjusted to smaller absorption volumes, that means to higher rotary speeds. By the action of the alternating backstroke valve 98, a momentary high pressure main conduit 11 or 12 is connected to the conduit 97.

Since at a certain maximum pressure the moment of the hydraulic motor decreases in response to the reduction of the absorbed volume of pressure fluid, an unstable behavior at the limit of the rotary moment might be expected due to the higher load moment which increases proportionally to the rotary speed. In other words, when the hydraulic motor, due to an excessive load, does not reach the preset desired rotary speed, it reacts with a further turning back, leading to the decrease of the rotary moment. To prevent this condition, there is again provided the so-called loss-free pressure limitation by means of the pressure limiting valves 67 and 68, which after responding to a preset maximum pressure permit further setting of the hydraulic motor. When the latter valves respond to the crossing of the maximum pressure, the dynamic pressure in discharge conduits 99 or 103 propagates via the alternating non-return valve 98 and the conduit 97 to the left face of the preliminary control valve 96. This pressure, which is now higher than that in the conduit 99, displaces the preliminary control valve 96 into its intermediate position, in which the setting cylinder 92 moves the adjusting member 91 of the hydraulic motor to a position which matches the maximum pressure. When the high pressure is exceeded, the preliminary control valve 96 is brought to its I position, whereupon the hydraulic motor is fully swung out, and the secondary pressure, which is still present in the conduits 79, 104 displaces the regulating valve 75 in such a manner that the setting cylinder 19 swings back or resets the pump 10. By virtue of this system combination, it is achieved that in setting a certain rotary speed, both machines operate at their greatest possible adjustment angle (at the lowest pressure) at which the best efficiency is obtained.

It will be understood that each of the elements described above, or two or more together, may also find a useful application in other types of constructions differing from the types described above.

While the invention has been illustrated and described as embodied in specific examples of a control circuit for hydrostatic drives, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. A control device for a hydrostatic drive having an adjustable pump, a pressure responsive setting cylinder coupled to said pump, a hydraulic motor connected via pressure conduits to said pump, and a measuring motor coupled to the hydraulic motor to rotate with a proportional rotary speed, the measuring motor having an inlet and an outlet, the outlet being connected via a conduit to said setting cylinder, comprising a nominal flow generator connected via a conduit to the inlet of said measuring motor to produce an adjustable control flow which when attained by said measuring motor determines the desired rotary speed of said hydraulic motor; and means for controlling flow difference between said nominal flow generator and said measuring motor, said controlling means being connected between the inlet and the outlet of said measuring motor to counteract pressure fluid supplied to said setting cylinder so as to keep adjusting said pump for so long as until the flow volume absorbed by said measuring motor equals the flow volume discharged from said nominal flow generator.

2. A device as defined in claim 1 wherein said controlling means includes a counteracting pressure space in said setting cylinder, said counteracting pressure space being connected to a branching point in the conduit between said measuring motor and said nominal flow generator.

3. A device as defined in claim 1, wherein said controlling means includes a control circuit formed of said measuring motor and an adjustable nominal flow generator.

4. A device as defined in claim 3, wherein said nominal flow generator is a flow regulating valve.

5. A control circuit as defined in claim 3, wherein said nominal flow generator includes an electrically or manually activated multiway control valve cooperating with a pressure balance.

6. A control device as defined in claim 3, wherein said nominal flow generator includes a pump driven by an electric motor.

7. A device as defined in claim 3 where said nominal flow generator is an adjustable throttle.

8. A device as defined in claim 5, wherein said multiway control valve is a proportional valve connected to a return conduit which includes a biased valve having an unloaded backstroke.

9. A device as defined in claim 5, further comprising an alternating non-return valve connected in series with said pressure balance and being activated by the pressure difference across said measuring motor so as to apply a higher pressure in a branch of said control circuit to said pressure balance.

10. A control device as defined in claim 9, further comprising a supply pump connected for delivering pressure fluid to said control circuit, the discharge port of said supply pump communicating with said pressure balance.

11. A control device as defined in claim 5, further comprising means for loss-free limiting of pressure in said working conduit for resetting the adjustable pump, said pressure limiting means including a pressure limiting valve in each of said pressure conduits and means for applying the excessive pressure to said multiway control valve so that the latter adjusts the setting cylinder and thus the pump to a lower adjusting angle.

12. A control device as defined in claim 5, comprising a regulating valve actuated by pressure difference across the measuring motor in said control circuit for controlling via said multiway control valve said setting cylinder.

13. A control device as defined in claim 11, comprising an adjustable hydraulic motor having an adjusting member coupled to said setting cylinder, a preliminary control valve connected to a pressure space of said setting cylinder, said preliminary control valve being exposed at one end to the pressure in said control circuit and at the other end to the pressure of a loading spring and to a pressure exceeding the maximum allowable pressure in one of said main working conduits.

* * * * *